US010936361B2

(12) United States Patent
Nanduru et al.

(10) Patent No.: US 10,936,361 B2
(45) Date of Patent: Mar. 2, 2021

(54) CLOUD AND DATACENTER MIGRATION WAVE PLANNING USING ANALYTICS AND FLOW MODELING

(71) Applicant: International Business Machines Corporation, Armonk, NY (US)

(72) Inventors: Laxmikantha Sai Nanduru, Secunderabad (IN); Anthony M. Hunt, Hopewell Junction, NY (US); Clea Anne Zolotow, Key West, FL (US); Florian Graf, Zurich (CH); Sean Thomas Fornash, Hillsborough, NH (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 273 days.

(21) Appl. No.: 16/009,177

(22) Filed: Jun. 14, 2018

(65) Prior Publication Data
US 2019/0384634 A1     Dec. 19, 2019

(51) Int. Cl.
G06F 9/48      (2006.01)
G06F 9/50      (2006.01)
G06N 7/00      (2006.01)
G06F 9/455     (2018.01)
H04L 29/08     (2006.01)

(52) U.S. Cl.
CPC ........ *G06F 9/4856* (2013.01); *G06F 9/45558* (2013.01); *G06F 9/4881* (2013.01); *G06F 9/5033* (2013.01); *G06F 9/5038* (2013.01); *G06N 7/005* (2013.01); *H04L 67/34* (2013.01); *G06F 2009/4557* (2013.01); *G06F 2209/506* (2013.01); *G06F 2209/5022* (2013.01)

(58) Field of Classification Search
None
See application file for complete search history.

(56) References Cited

U.S. PATENT DOCUMENTS 7,818,410 B1 * 10/2010 Barnes .................. G06F 9/4856
                                                   709/223
8,549,513 B2 * 10/2013 Vinberg .............. G06F 9/45558
                                                   717/174
8,914,789 B2    12/2014 Barros et al.
(Continued)

OTHER PUBLICATIONS

Kherbache et al. "Scheduling Live-Migrations for Fast, Adaptable and Energy-Efficient Relocation Operations", 2015 IEEE, pp. 205-216.*

(Continued)

*Primary Examiner* — Van H Nguyen
(74) *Attorney, Agent, or Firm* — Garg Law Firm, PLLC; Rakesh Garg; Brian Restauro (57) ABSTRACT

A set of workloads to be migrated is identified. A constraint on optimization of the set of workloads is determined. A subset of workloads to be migrated is selected from the set of workloads. A model is constructed, using traffic information corresponding to the set of workloads. The model includes a representation of a relationship between a first workload and a second workload in the subset of workloads. The model is solved to cause generation of a set of optimal flow values. A schedule for a migration wave is constructed. The schedule complies with the constraint on optimization of the set of workloads.

17 Claims, 5 Drawing Sheets

(56) References Cited

U.S. PATENT DOCUMENTS

| | | | |
|---|---|---|---|
| 9,092,837 B2* | 7/2015 | Bala | G06F 11/1402 |
| 9,141,919 B2* | 9/2015 | Athey | G06Q 10/06 |
| 9,282,166 B2* | 3/2016 | Markley | H04L 67/34 |
| 9,292,330 B2* | 3/2016 | Bonilla | G06F 9/45558 |
| 9,317,270 B2* | 4/2016 | Vinberg | G06F 9/45558 |
| 9,454,408 B2* | 9/2016 | Dutta | H04L 41/0823 |
| 9,600,264 B2 | 3/2017 | Draper et al. | |
| 9,612,765 B2 | 4/2017 | Huang et al. | |
| 10,255,136 B2* | 4/2019 | Salapura | G06F 11/1458 |
| 10,305,814 B2* | 5/2019 | Conner | G06F 3/0647 |
| 2014/0033197 A1* | 1/2014 | Vinberg | G06F 8/61 |
| | | | 717/174 |
| 2016/0092801 A1 | 3/2016 | Carden et al. | |
| 2017/0083403 A1* | 3/2017 | Salapura | H04L 67/10 |
| 2018/0145885 A1* | 5/2018 | Rao | H04L 41/22 |

OTHER PUBLICATIONS

Hwang et al. "Automation and orchestration framework for large-scale enterprise cloud migration," in IBM Journal of Research and Development, vol. 60, No. 2-3, pp. 1:1-1:12, Mar.-May 2016.*

Hwang, Jinho, et al., "Automation and Orchestration Framework for Large-scale Enterprise Cloud Migration," IBM Journal of Research and Development 60, No. 2-3, 2016, 12 pages.

Pachorkar, Nilesh, et al., "Multi-dimensional Affinity Aware VM Placement Algorithm in Cloud Computing," International Journal of Advanced Computer Research, vol. 3, No. 4, 2013, pp. 121-125.

* cited by examiner

CLOUD AND DATACENTER MIGRATION WAVE PLANNING USING ANALYTICS AND FLOW MODELING

TECHNICAL FIELD

The present invention relates generally to a method, system, and computer program product for migrating data processing systems from one datacenter to another. More particularly, the present invention relates to a method, system, and computer program product for migration wave planning using analytics and flow modeling.

BACKGROUND

As information technology (IT) improves, business needs change, and cloud services are more widely adopted, IT service providers often need to upgrade, relocate, or consolidate IT assets and reduce operational costs. As a result, providers need repeatable, cost-effective methods to relocate business IT systems—including hardware, software applications, and network gear—from one facility or platform to another. Most migrations are performed within migration windows—times of fewer users and reduced traffic, such as weekends, when disruptions to IT service users are less likely. If a migration project cannot be completed in one migration window, multiple phases will be necessary. However, labor, time, and costs of datacenter migration projects must still be minimized.

In datacenter migration projects, a server configuration to be migrated is referred to as an 'image', and an application running on one or more servers is called a 'workload'. Migrations that are too large to fit into one migration window are typically split into 'waves'. Each migration wave comprises a set of similar or disparate workloads or images, as appropriate for a particular migration.

When the IT infrastructure includes segregated production, development, testing, and staging environments, each with custom business requirements necessitating distinct migration approaches, datacenter migration complexity increases substantially. Migration approaches further vary based on the workload characteristics of the servers. For example, servers may be physical or virtual, legacy or end-of-life systems or current systems, mainframe systems or midrange servers, and business-critical high-availability systems or standalone department level systems with downtime tolerance.

Shared storage may also need to be migrated. All workloads using the shared storage should be migrated together to avoid adversely impacting operations due to data latency.

As well, workloads may run on more than one server, and the servers often communicate among themselves. This affinity among servers imposes further restrictions on migration wave planning. Servers in an affinity group should also be migrated together to avoid adversely impacting operations due to data latency.

An efficient migration project should be as short as possible while keeping the risks of business disruption to a minimum. Migration costs time and money, so only necessary workloads should be moved. If there are duplicate workloads, for example, only one may need to be moved. However, once the list of workloads to be moved has been finalized, waves should be as large as possible within hardware constraints. There should also be as few waves as possible to keep the project manageable and cost efficient. However, migrating too much at once increases both risks of a problem and the time required to solve such a problem. Splitting affinity groups and groups using shared storage may increase response time and other latency issues, as well as increasing risks related to application complexity.

SUMMARY

The illustrative embodiments provide a method, system, and computer program product. An embodiment includes a method that identifies a set of workloads to be migrated. The embodiment determines a constraint on optimization of the set of workloads. The embodiment selects, from the set of workloads, a subset of workloads to be migrated. The embodiment constructs, using traffic information corresponding to the set of workloads, a model, the model including a representation of a relationship between a first workload and a second workload in the subset of workloads. The embodiment solves the model to cause generation of a set of optimal flow values. The embodiment constructs, using the set of optimal flow values, a schedule for a migration wave, the schedule complying with the constraint on optimization of the set of workloads.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Existing approaches to analyzing source datacenter environments to improve migration wave composition and sizes include: infrastructure discovery tools that capture communication flows between servers and map the dependencies and application affinity; extrapolating the results of smaller pilot migrations to plan an overall migration project; estimating based on previous relocation projects; and empirical estimates using inputs from subject matter experts. For example, one currently-available implementation computes randomized complexity factors covering application and datacenter complexity. Then, utilizing known image migration rates for differing application complexity, the implementation starts with an existing migrating image and computes a range of time estimates for the migration of various types of datacenter equipment. Another currently-available implementation determines cost factors and constraints associated with migrating components to construct a cost-based model, then using the cost-based model to form migration waves. A third currently-available implementation groups objects into migration waves such that cross-wave relationships are minimized. Other currently-available implementations analyze application dependencies between systems being relocated, but require human planners to make use of the resulting information.

Currently-used migration plans are often suboptimal. Often, migration starts with as large a wave as possible. If problems occur, the wave is pruned down and the migration retried. However, these successive retries may consume an entire migration window, adding time and expense.

As a result, migration planning as currently performed is a mostly manual, labor intensive process that is heavily dependent on the planner's knowledge and previous experience. When large global datacenter relocation projects are involved, such methods are insufficiently robust. Once a plan is created, current tools may be used to create a migration schedule, and perform the actual copying of one image to its new location. However, a suboptimal plan will be less efficient, resulting in a longer, riskier, and more expensive migration project. An improved solution would satisfy the constraints discussed herein and be time and resource-efficient as well as be adaptable with changing external factors.

The illustrative embodiments recognize that the presently available tools or solutions do not address these needs or provide adequate solutions for these needs. The illustrative embodiments used to describe the invention generally address and solve the above-described problems and other problems related to migration wave planning.

An embodiment can be implemented as a software application. The application implementing an embodiment can be configured as a modification of an existing migration wave planning system, as a separate application that operates in conjunction with an existing migration wave planning system, a standalone application, or some combination thereof. Particularly, some illustrative embodiments provide a method by which a migration wave schedule can be determined.

According to an illustrative embodiment, an application identifies a set of workloads to be migrated. The set of workloads can be identified based, for example, on information about the workloads and images in the source environment. Information may be collected manually, using one or more software tools, or using a combination of manual and automated means. For example, a software tool in accordance with an illustrative embodiment observes network traffic over time. In a non-limiting example, such a software tool reports the names of applications on the network, the IP addresses of servers on the network, the amount, type, and timing of network traffic between applications, or some combination of these and other similarly purposed information.

Optionally, information regarding the workloads and images in the source environment can be obtained manually, in accordance with an illustrative embodiment. Some non-limiting examples of information that can be obtained manually include regulatory requirements, disaster recovery and high availability requirements, and archiving requirements. Migration planners collect such information, for example, by referencing documentation or interviewing knowledgeable application owners.

Further, not all workloads in the source environment may fit into the target environment, or there may be other reasons for not migrating specific workloads. Datacenter administrators or migration planners can park such workloads and flag them as "leave behind".

An application in accordance with an illustrative embodiment also determines constraints on optimization of the workloads to be migrated. One non-limiting example of such a constraint is a migration wave size per workload type. Another non-limiting example of such a constraint is throughput requirements that limit, for example, how much data can be moved during the migration. Another non-limiting example of such a constraint is the characteristics of the source or target environments—for example, the ability to send or receive migration data without degrading an environment's existing workload. As another example, the number and qualifications of personnel available to work during each migration window could limit how much migration could be performed during that window, or what types of migration activities those personnel are qualified to perform. As well, a customer could impose additional constraints—for example, that applications that are used most heavily may only undergo one change per month, to limit risk and the potential for business disruption if problems occur during migration.

An application in accordance with an illustrative embodiment selects a subset of workloads that will actually be migrated. As an example, the subset can be selected based on analyzing the original set of workloads for architectural affinities between the workloads requiring migration. For example, an installation to be migrated may include multiple instances of the same server or application. Migrating only a subset of these multiple instances reduces network traffic during migration, as fewer images will need to be migrated.

Note that this architectural affinity methodology can also support a transformation during the migration process. For example, planners may want to add additional identical application instances in the target environment. As the application instances are identical, only a subset of the application instances will need to be migrated. After migration, the rest of the desired application instances can then be duplicated in the target environment.

Once the assets requiring migration are pared down, an application in accordance with an illustrative embodiment constructs a model representing the relationships between images. In a non-limiting example, relationships between images are modelled using a Bayesian acyclic graph. In the model, relationships between images are weighted, denoting relationship strengths based on how images process their workloads.

In a non-limiting example, weights can be determined using the observed traffic transfer rate and the periodicity of that transfer rate between workloads. For example, periodic traffic spikes, such as once per hour or once per day, may indicate a backup application, or many employees logging in at the beginning of their workday. Because traffic spikes only happen periodically, separating the involved servers will not greatly affect network throughput. On the other hand, a consistently high level of traffic, without periodic spikes, may indicate an application that communicates frequently with other instances over the network, i.e. a chatty application for which latency should not exceed an application-dependent amount. For example, chatty applications usually perform poorly when latencies rise above 8 ms. For these reasons, relationships between images running chatty applications can be assigned a high weight, while relationships between images running backup applications can be assigned a low weight. Other traffic patterns may indicate different types of applications and be assigned different weights, as appropriate.

The model, once constructed, is extended to form, for example, a maximum flow model representing the images requiring migration. Wave scheduling can be considered as solving a maximum flow problem. In optimization theory, maximum flow problems involve finding a feasible flow through a single-source, single-sink flow network that is maximum. The input to the wave scheduling problem is a set of images F which contains the information about where and when each image migrates from and where it migrates to. In a non-limiting example, the goal is to produce a feasible schedule with at most k latency.

To solve the wave-scheduling problem, an application constructs a bounded circulation, a generalization of network flow problems, with the added constraint of a lower bound on edge flows. Let G=(V, E) be a network with s,t∈V as the source and the sink nodes. For the source and destination of every image i, one adds two nodes to V, node $s_i$ as the source and node $d_i$ as the destination node of image i. One also adds the following edges to E (based on the acyclic graphing done already):

1. An edge with capacity [0, 1] between s and each $s_i$.
2. An edge with capacity [0, 1] between each $d_i$ and t.
3. An edge with capacity [1, 1] between each pair of $s_i$ and $d_i$.
4. An edge with capacity [0, 1] between each $d_i$ and $s_j$, if source $s_j$ is reachable with a reasonable amount of time and cost from the destination of flight i.
5. An edge with capacity [0, ∞] between s and t.

Solving the maximum flow model just constructed to find a flow value of k in G between s and t is equivalent to finding an optimized migration wave schedule for image set F with at most k images, satisfying the given constraints and taking affinities and affinity weights into account. The model may be solved using any known algorithm for solving problems of this type, causing generation of a set of optimal flow values.

Finally, the set of optimal flow values is used to construct a migration wave schedule conforming to the initial constraints. For example, if the initial constraints on the migration are set such that only very chatty applications are migrated together, the resulting set of optimal flow values might mean that too few workloads are moved together for an efficient migration. In such a case, one could lower the threshold for keeping images together, rerun the model construction and solving, and reevaluate the resulting migration wave sizes. On the other hand, if the threshold for keeping images together is set to a midrange weight, the resulting set of optimal flow values might mean that more workloads are moved together than can fit within a migration window. In such a case, one could raise the threshold for keeping images together, rerun the model construction and solving, and reevaluate the resulting migration wave sizes.

A migration wave schedule, in accordance with an illustrative embodiment, includes, for example, a build-sheet, costing, and wave plans for the target environment, as well as risk profiling and analysis for specific migration waves. The result is a migration schedule satisfying the constraints discussed herein that is time and resource-efficient as well as adaptable with changing external factors. Additionally, the calculator has parameters that allow for larger wave sizes if the supporting infrastructure allows.

The manner of planning a migration wave schedule described herein is unavailable in the presently available methods. A method of an embodiment described herein, when implemented to execute on a device or data processing system, comprises substantial advancement of the functionality of that device or data processing system in planning a migration wave schedule without extensive trial and error.

The illustrative embodiments are described with respect to certain types of migrations, network configurations, servers, models, measurements, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefore, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 1:
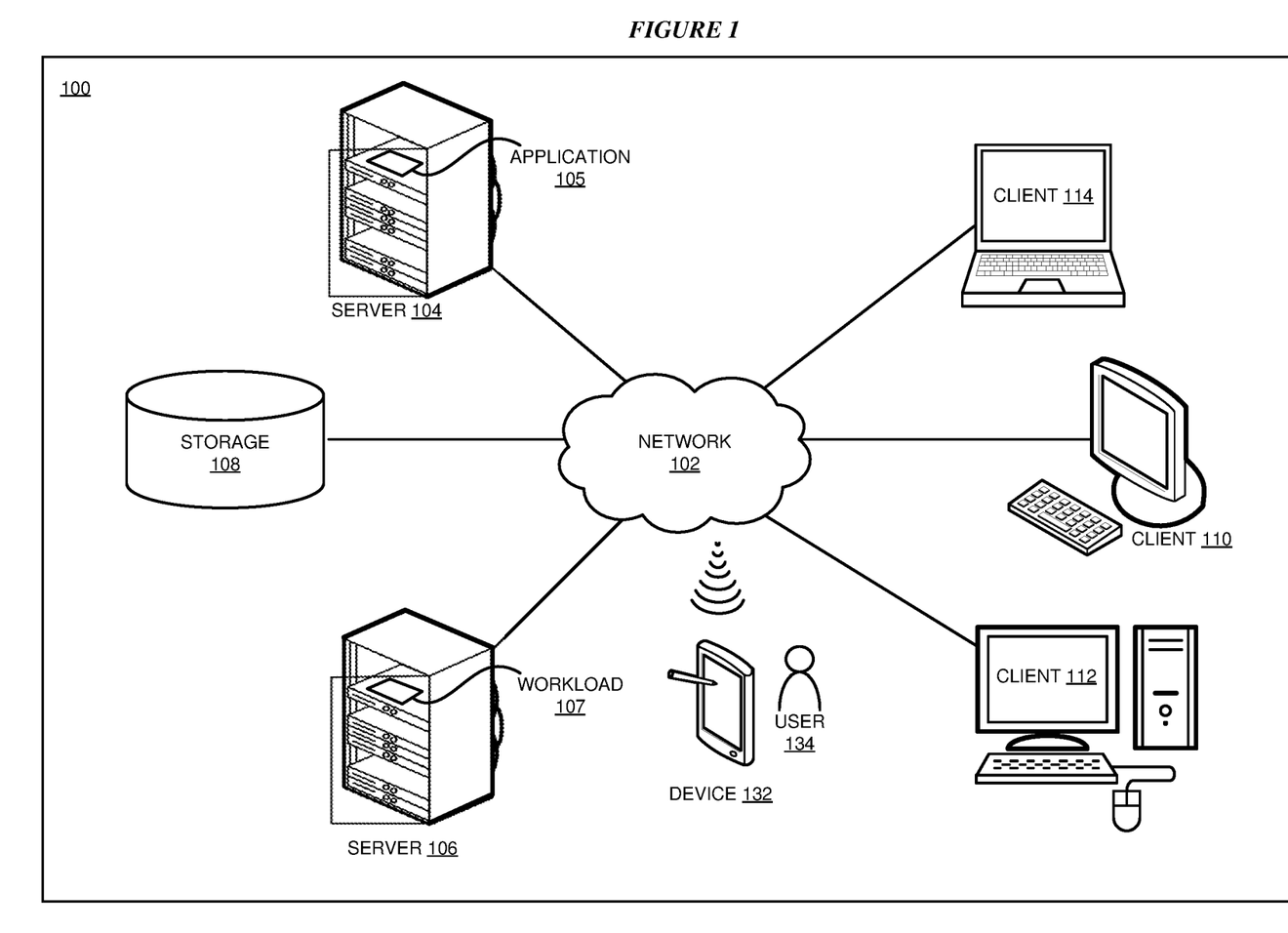
FIG. 1 depicts certain components that are usable in an example implementation of an embodiment.
Figure 2:
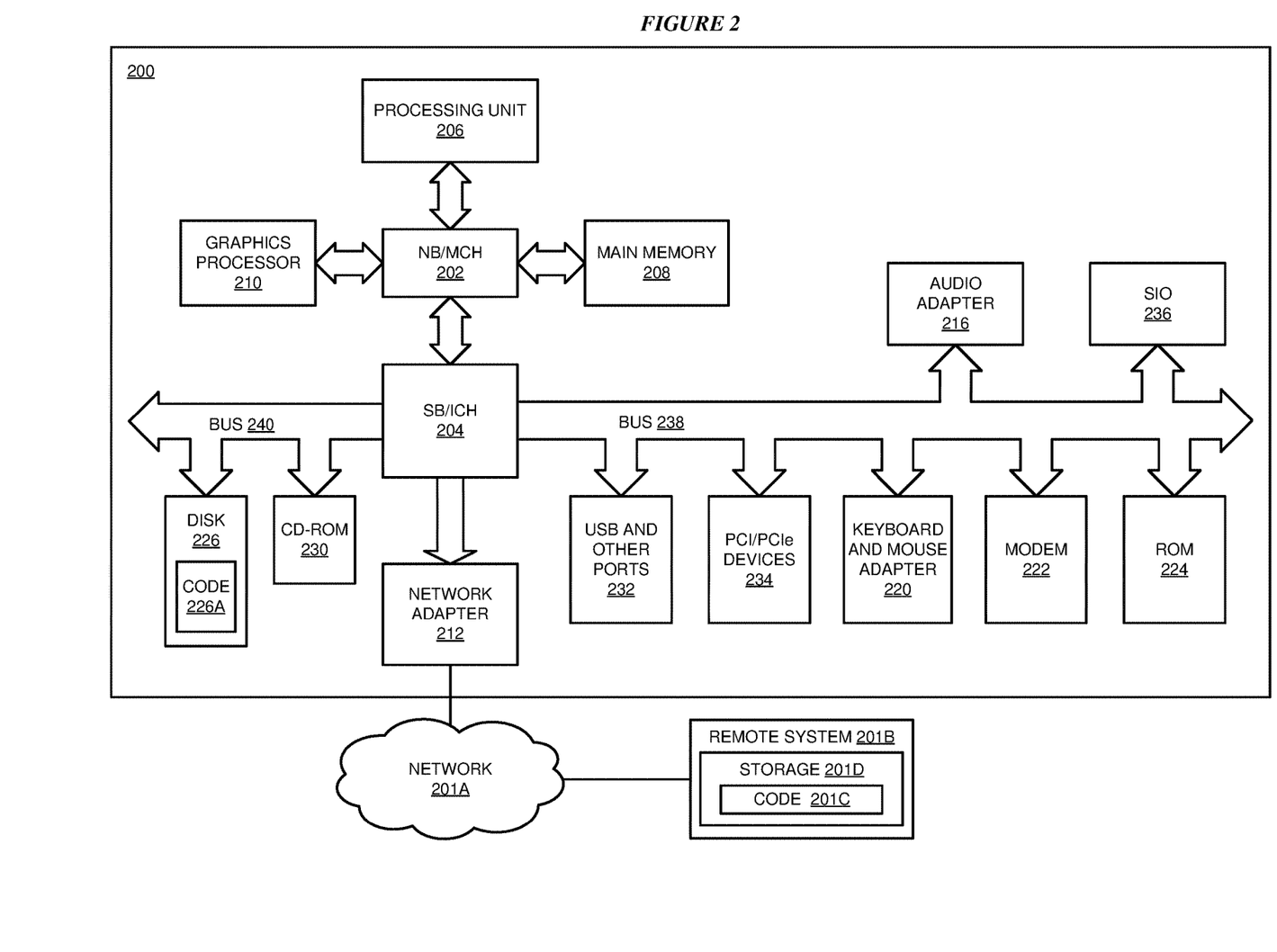
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be Implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Application 105 may execute in server 104. Alternatively, portions of application 105 may each execute in clients 110, 112, or 114, or in servers 104 or 106. Example workload 107 executes in server 106. Clients 110, 112, and 114, and servers 104 and 106 are examples of physical or virtual assets that can participate in a migration as described herein. Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
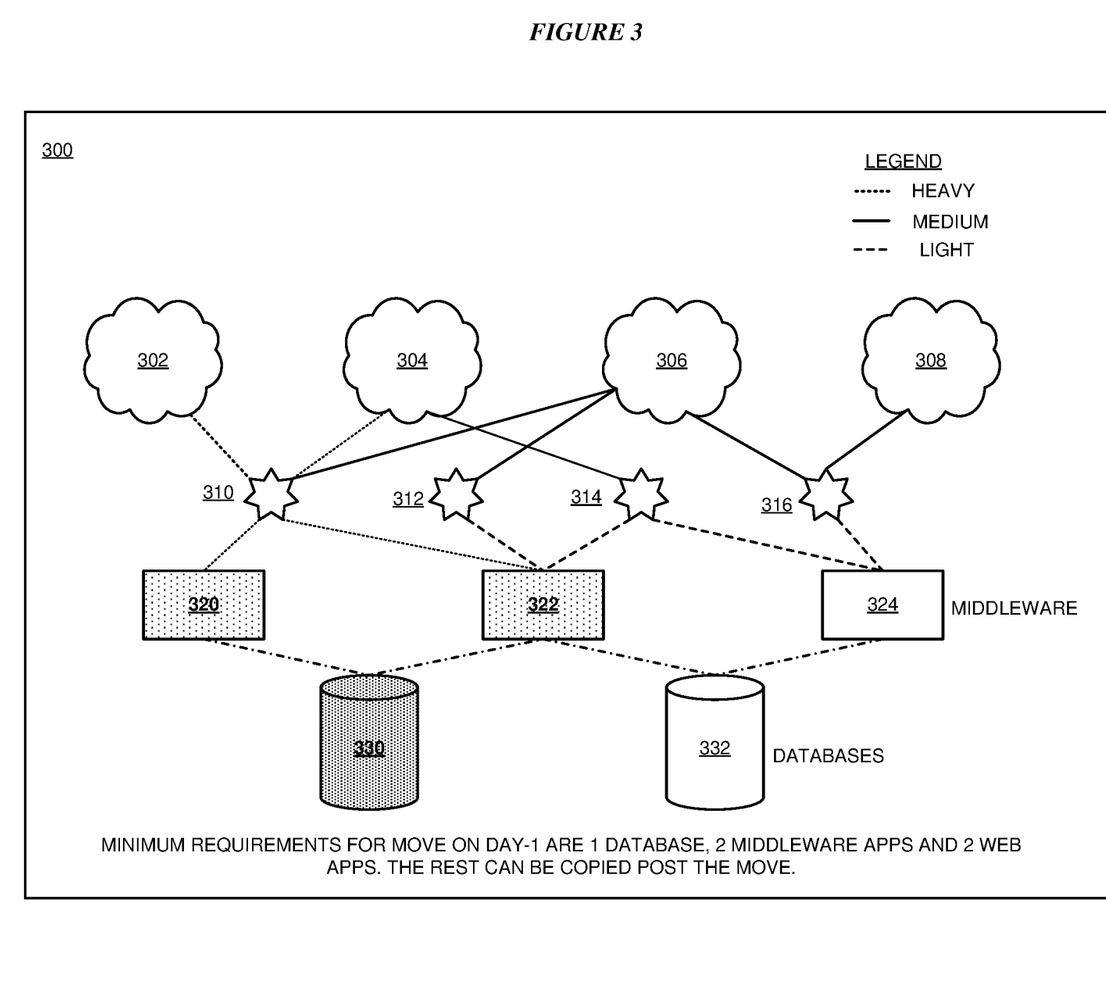
FIG. 3 depicts an example of workload paring using architectural affinities in accordance with an illustrative embodiment.

FIG. 3 depicts an example of workload paring using architectural affinities in accordance with an illustrative embodiment. FIG. 3 shows a non-limiting example network 300, which is to be migrated. Network 300 includes identical web application instances 302, 304, 306, and 308, sending traffic through network nodes 310, 312, 314, and 316. Network nodes 310, 312, 314, and 316 also communicate with identical middleware application instances 320, 322, and 324. Middleware application instances 320, 322, and 324 utilize identical database instances 330 and 332. Dotted lines between modules indicate that, due to the load balancing set up on network 300, the heaviest traffic flows among web application instances 302 and 304, network node 310, and middleware application instances 320 and 322, while dashed lines between modules indicate that the lightest traffic flows among network nodes 312, 314, and 316 and middleware application instance 324.

In this example, for safety the migration planners would like to migrate two web application instances, two middleware instances, and one database instance. Because of the heavier traffic flows among web application instances 302 and 304, network node 310, and middleware application instances 320 and 322, these workloads will be migrated together. Once the migration is complete, web application instance 302 may be duplicated twice to result in four web application instances. Similarly, once migrated, middleware application instance 320 may be duplicated to result in three middleware instances, and database 330 may also be duplicated to result in two databases instances. As a result, the entire original environment can be migrated to the target without actually having to move all identical instances, saving time and bandwidth.

Figure 4:
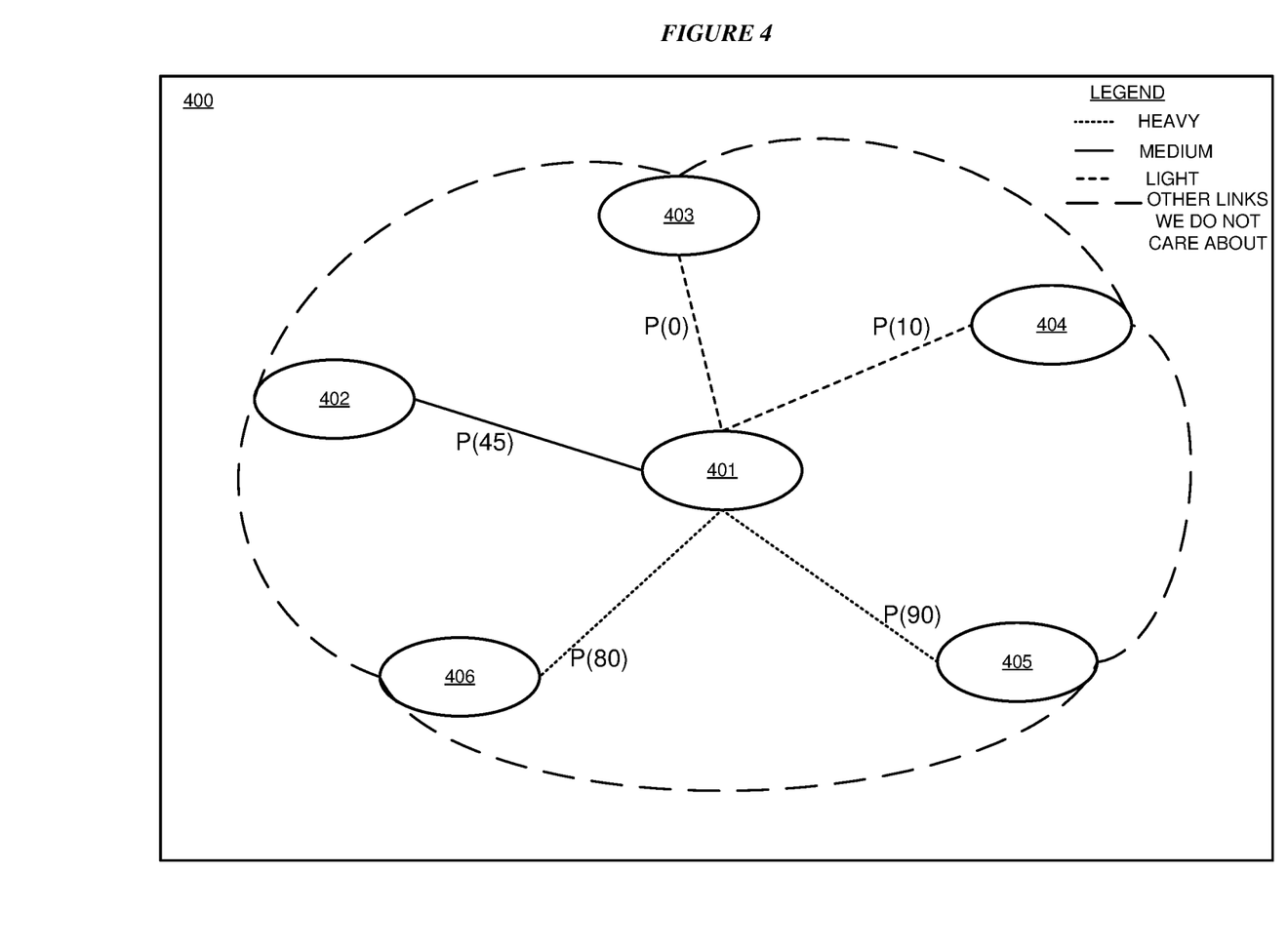
FIG. 4 depicts an example of a Bayesian acyclic graph modeling relationships between images in an example environment to be migrated, in accordance with an illustrative embodiment.

FIG. 4 depicts an example of a Bayesian acyclic graph 400 modeling relationships between images in an example environment to be migrated, in accordance with an illustrative embodiment. Relationships between these images have been weighted using a 0-100 range. The weights correspond to the strength of the bond between images based on how images process their workloads.

For example, a credit update application runs on image 402, periodically communicating with an application running on image 401. An analysis tool or human planner has analyzed the traffic pattern between images 401 and 402 to a midrange weighting of p(45). A storage management application instance running on image 403 does not communicate at all with image 401, and this is indicated by the p(0) weighting between images 401 and 403. As a result, image 403 can be moved independently of image 401. An Extract, Transform, Load (ETL) instance running on image 404 communicates rarely with image 401 as the ETL instance serves some data to an application running on image 401, and this is indicated by the p(10) weighting between images 401 and 404. As a result, image 403 can likely be moved independently of image 401. However, there is a chatty banking application running on images 401, 405 and 406, indicated by the p(90) weighting on the link between images 405 and 401 and the p(80) weighting on the link between images 406 and 401. The high weightings indicate that latency between these images should not exceed a certain amount that is usually application driven. The latency standard is usually 5-8 milliseconds (ms) between chatty applications. If a link weighted at p(100) could tolerate 8 ms of latency, a link weighted at p(80) could tolerate 20 percent more, or 9.6 ms of latency (where p(x1)−p(x2)=20; then 8 ms*1.2=9.6 ms).

Figure 5:
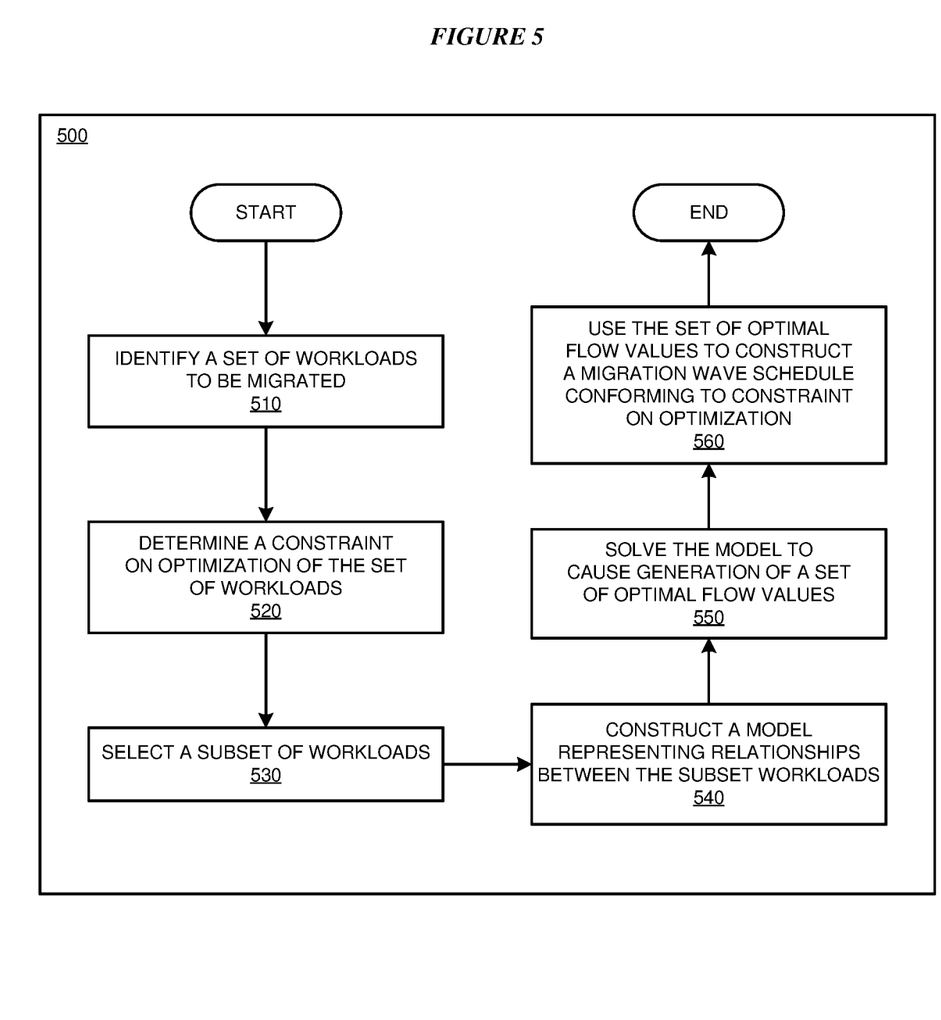
FIG. 5 depicts a flowchart for an example application for cloud and datacenter migration wave planning in accordance with an illustrative embodiment.

FIG. 5 depicts a flowchart for an example application 500 for cloud and datacenter migration wave planning in accordance with an illustrative embodiment. Application 500 is an example of application 105 in FIG. 1, which may execute in server 104 in FIG. 1. Alternatively, portions of application 500 may each execute in clients 110, 112, or 114, or in servers 104 or 106.

First, in block 510, application 500 identifies a set of workloads to be migrated. The set of workloads can be identified based, for example, on information about the workloads and images in the source environment. Information may be collected manually, using one or more software tools, or using a combination of manual and automated means.

In block 520, application 500 determines constraints on optimization of the workloads to be migrated. Non-limiting examples of such constraints include migration wave size per workload type, throughput requirements, source or target environment characteristics, personnel constraints, and customer constraints.

In block 530, application 500 selects a subset of workloads that will actually be migrated. For example, the subset can be selected based on analyzing the original set of workloads for architectural affinities between the workloads requiring migration.

In block 540 application 300 constructs a model representing the relationships between images. In a non-limiting example, relationships between images are modelled using a Bayesian acyclic graph. In the model, relationships between images are weighted, denoting relationship strengths based on how images process their workloads. For example, to determine weights block 540 can use the observed traffic transfer rate and the periodicity of that transfer rate between workloads. Relationships between images running chatty applications are assigned a high weight, while relationships between images running backup applications are assigned a low weight. Using a 0-100 range, 80 and 90 are examples of high weights, 45 is an example of midrange weight, and 0 and 10 are examples of low weights. Other traffic patterns may indicate different types of applications and are assigned different weights, as appropriate.

Also in block 540, the model is extended to form, for example, a maximum flow model representing the images requiring migration. As described herein, wave scheduling can be considered as solving a maximum flow problem. In optimization theory, maximum flow problems involve finding a feasible flow through a single-source, single-sink flow network that is maximum. The input to the wave scheduling problem is a set of images F which contains the information about where and when each image migrates from and where it migrates to. In a non-limiting example, the goal is to produce a feasible schedule with at most k latency. To this end, block 540 constructs a bounded circulation, a generalization of network flow problems, as described herein.

Next, in block 550 application 500 solves the maximum flow model to find a flow value of k in G between s and t. This is equivalent to finding an optimized migration wave schedule for image set F with at most k images, satisfying the given constraints and taking affinities and affinity weights into account. The model may be solved using any known algorithm for solving problems of this type, causing generation of a set of optimal flow values.

Finally, in block 560 calculates the set of optimal flow values is used to construct a migration wave schedule conforming to the initial constraints. For example, if the initial constraints determined in block 520 are set such that only very chatty applications are migrated together, the resulting set of optimal flow values might mean that too few workloads are moved together for an efficient migration. In such a case, blocks 520, 540, and 550 could be rerun with a lower threshold for keeping images together and the resulting migration wave sizes reevaluated. On the other hand, if the threshold for keeping images together is set to a midrange weight, the resulting set of optimal flow values might mean that more workloads are moved together than can fit within a migration window. In such a case, blocks 520, 540, and 550 could be rerun with a higher threshold for keeping images together and the resulting migration wave sizes reevaluated.

Application 500 produces a migration wave schedule conforming to any constraints determined in block 520. This schedule includes, for example, a build-sheet, costing, and wave plans for the target environment, as well as risk profiling and analysis for specific migration waves. The result is a migration schedule satisfying the constraints discussed herein that is time and resource-efficient as well as adaptable with changing external factors. Additionally, the calculator has parameters that allow for larger wave sizes if the supporting infrastructure allows.

Thus, a computer implemented method, system or apparatus, and computer program product are provided in the illustrative embodiments for migration wave planning. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
identifying a set of workloads to be migrated;
determining a constraint on optimization of the set of workloads;
selecting, from the set of workloads, a subset of workloads to be migrated;
constructing, using traffic information of network traffic among the set of workloads, a model, wherein the model comprises a representation of a traffic transfer relationship between a first workload and a second workload in the subset of workloads;
solving the model to cause generation of a set of optimal flow values; and
constructing, using the set of optimal flow values, a schedule for a migration wave, wherein the schedule complies with the constraint on optimization of the set of workloads,
wherein the traffic information of network traffic among the set of workloads comprises information regarding the amount, type, and timing of network traffic between applications running on the set of workloads to be migrated.

2. The computer-implemented method of claim 1, further comprising determining architectural affinities between the set of workloads to be migrated based on the traffic information of network traffic among the set of workloads.

3. The computer-implemented method of claim 2, wherein selecting a subset of workloads to be migrated is based on the determined architectural affinities.

4. The computer-implemented method of claim 1, wherein the model comprises a Bayesian acyclic graph.

5. The computer-implemented method of claim 4, further comprising extending the Bayesian acyclic graph to form a maximum flow model.

6. The computer-implemented method of claim 5, wherein solving the model to cause generation of a set of optimal flow values further comprises solving the maximum flow model.

7. A computer usable program product comprising one or more computer-readable storage media, and program instructions stored on at least one of the one or more storage media, the stored program instructions comprising:
program instructions to identify a set of workloads to be migrated;
program instructions to determine a constraint on optimization of the set of workloads;
program instructions to select, from the set of workloads, a subset of workloads to be migrated;
program instructions to construct, using traffic information of network traffic among the set of workloads, a model, wherein the model comprises a representation of a traffic transfer relationship between a first workload and a second workload in the subset of workloads;
program instructions to solve the model to cause generation of a set of optimal flow values; and
program instructions to construct, using the set of optimal flow values, a schedule for a migration wave, wherein the schedule complies with the constraint on optimization of the set of workloads,
wherein the traffic information of network traffic among the set of workloads comprises information regarding the amount, type, and timing of network traffic between applications running on the set of workloads to be migrated.

8. The computer usable program product of claim 7, further comprising program instructions to determine architectural affinities between the set of workloads to be migrated based on the traffic information of network traffic among the set of workloads.

9. The computer usable program product of claim 8, wherein selecting a subset of workloads to be migrated is based on the determined architectural affinities.

10. The computer usable program product of claim 7, wherein the model comprises a Bayesian acyclic graph.

11. The computer usable program product of claim 10, further comprising program instructions to extend the Bayesian acyclic graph to form a maximum flow model.

12. The computer usable program product of claim 11, wherein solving the model to cause generation of a set of optimal flow values further comprises solving the maximum flow model.

13. The computer usable program product of claim 7, wherein the computer usable code is stored in a computer readable storage device in a data processing system, and wherein the computer usable code is transferred over a network from a remote data processing system.

14. The computer usable program product of claim 7, wherein the computer usable code is stored in a computer readable storage device in a server data processing system, and wherein the computer usable code is downloaded over a network to a remote data processing system for use in a computer readable storage device associated with the remote data processing system.

15. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:
program instructions to identify a set of workloads to be migrated;
program instructions to determine a constraint on optimization of the set of workloads;
program instructions to select, from the set of workloads, a subset of workloads to be migrated;
program instructions to construct, using traffic information of network traffic among the set of workloads, a model, wherein the model comprises a representation of a traffic transfer relationship between a first workload and a second workload in the subset of workloads;
program instructions to solve the model to cause generation of a set of optimal flow values; and
program instructions to construct, using the set of optimal flow values, a schedule for a migration wave, wherein the schedule complies with the constraint on optimization of the set of workloads,
wherein the traffic information of network traffic among the set of workloads comprises information regarding the amount, type, and timing of network traffic between applications running on the set of workloads to be migrated.

16. The computer system of claim 15, wherein the model comprises a Bayesian acyclic graph, and further comprising program instructions to extend the Bayesian acyclic graph to form a maximum flow model.

17. The computer system of claim 16, wherein solving the model to cause generation of a set of optimal flow values further comprises solving the maximum flow model.

\* \* \* \* \*